United States Patent [19]
Nakamura

[11] 4,206,483
[45] Jun. 3, 1980

[54] AUTOMATIC CHECKING DEVICE FOR PRESET RECORDING PROGRAM OF RECORDING AND REPRODUCING APPARATUS

[75] Inventor: Tadahiko Nakamura, Kanagawa, Japan

[73] Assignee: Sony Corporation, Tokyo, Japan

[21] Appl. No.: 935,968

[22] Filed: Aug. 22, 1978

[30] Foreign Application Priority Data

Aug. 25, 1977 [JP] Japan .................. 52-102862

[51] Int. Cl.² ........................................... H04N 5/76
[52] U.S. Cl. ................................... 360/33; 360/137; 455/231
[58] Field of Search ................ 360/31, 137, 33, 60, 360/69, 85, 92; 179/100.11, 100.1 R, 100.1 DR; 358/127; 325/311, 396

[56] References Cited

U.S. PATENT DOCUMENTS

| 3,821,799 | 6/1974 | Sumiyoshi | 360/60 |
|---|---|---|---|
| 3,845,248 | 10/1974 | Ando | 179/100.1 DR |
| 3,949,425 | 4/1976 | Perret | 360/137 |
| 3,962,532 | 6/1976 | Aubert | 360/33 |
| 3,965,484 | 6/1976 | Matz | 179/100.1 DR |
| 4,021,855 | 5/1977 | Czonka | 360/69 |
| 4,075,900 | 2/1978 | Hattendorf | 360/33 |
| 4,081,753 | 3/1978 | Miller | 325/396 |
| 4,088,958 | 5/1978 | Suzuki | 325/396 |
| 4,092,679 | 5/1978 | Sander | 179/100.1 DR |
| 4,130,843 | 12/1978 | Miyamoto | 360/60 |
| 4,133,013 | 1/1979 | Fisher | 360/92 |

Primary Examiner—Bernard Konick
Assistant Examiner—Alan Faber
Attorney, Agent, or Firm—Lewis H. Eslinger; Alvin Sinderbrand

[57] ABSTRACT

In a recording and reproducing apparatus, such as, a video tape recorder or VTR, which can be preset to establish a desired recording program, that is, to initiate and terminate successive recording intervals at predetermined times, the aggregate of the tape or other record medium needed for the recording of signals thereon in the preset recording intervals is compared with the amount or capacity of record medium available for recording and, in the event of a deficiency of the latter, a suitable alarm or indication is provided to avoid a failure to record desired signals. An alarm or indication is further provided if there is overlapping of the preset recording intervals, or if the apparatus is not in condition for recording, for example, by reason of the absence of a tape cassette or other record medium from the apparatus or the presence of a record medium which is already recorded with signals to be preserved.

14 Claims, 3 Drawing Figures

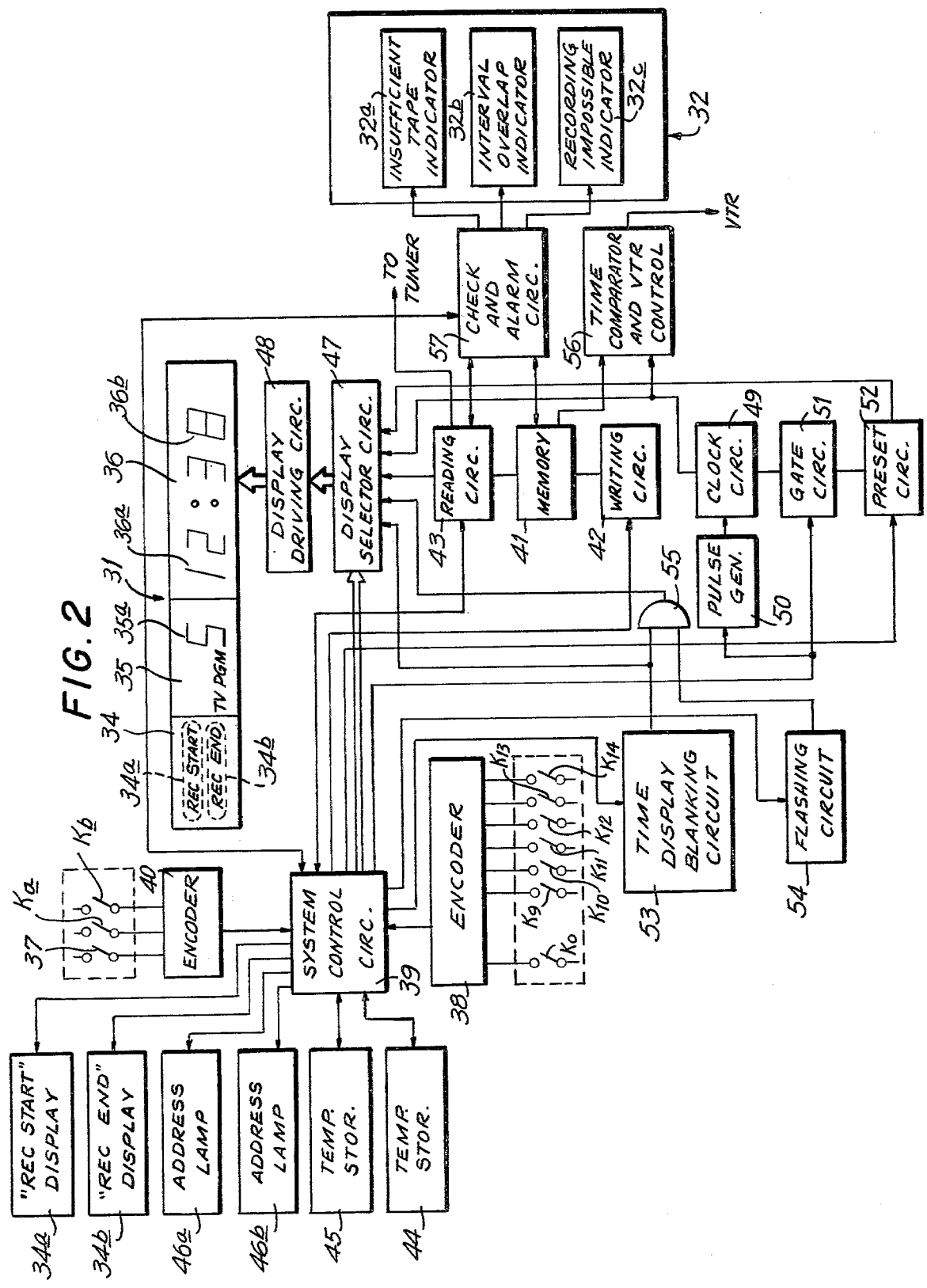

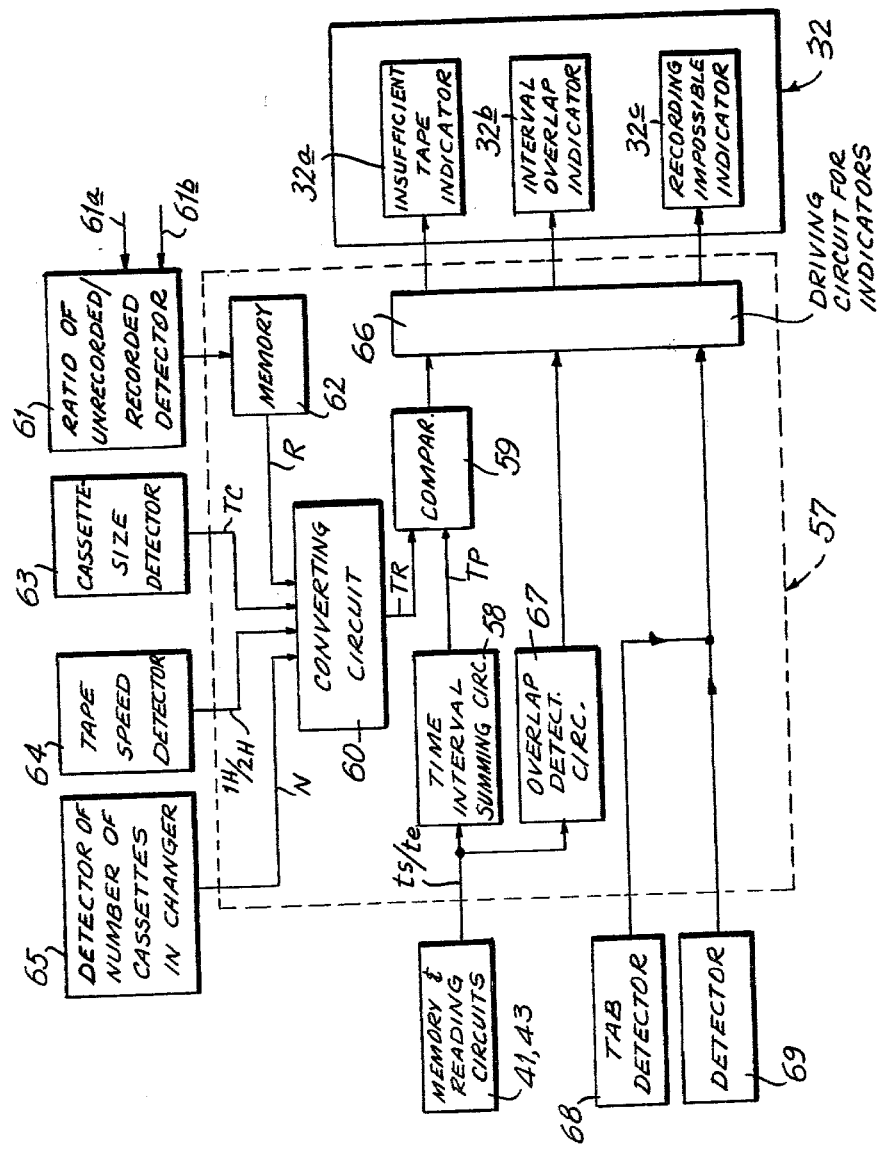

AUTOMATIC CHECKING DEVICE FOR PRESET RECORDING PROGRAM OF RECORDING AND REPRODUCING APPARATUS

BACKGROUND OF THE INVENTION

1. Field of the Invention

This invention relates generally to recording and reproducing apparatus, such as, video tape recorders or VTRs, and more particularly is directed to improvements in such apparatus which can be preset to establish a desired recording program, that is, to automatically initiate and terminate successive recording intervals at predetermined times.

2. Description of the Prior Art

Video tape recorders or VTRs have been provided with programming arrangements by which a desired recording program can be preset by the user to automatically initiate and terminate successive recording intervals at predetermined times. Thus, with VTR of the described type, program material, such as, sporting events, specials or the like, broadcast at times when the VTR will be unattended can be nevertheless automatically recorded provided that the VTR contains a supply of magnetic recording tape or other record medium sufficient for the preset recording intervals. However, in the existing VTR capable of being preset to establish a desired recording program, no provision is made for determining that the supply of tape present in the VTR is sufficient to complete such recording program. Therefore, the tape in the unattended VTR may become exhausted or run out prior to the completion of the preset recording program, with the result that at least a portion of the desired program material will not be recorded.

OBJECTS AND SUMMARY OF THE INVENTION

Accordingly, it is an object of this invention to provide a recording and reproducing apparatus, such as, a video tape recorder or VTR, which can be preset to establish a desired program, and which avoids the above-mentioned disadvantages of the prior art.

More particularly, it is an object of this invention to provide a recording and reproducing apparatus, such as, a video tape recorder or VTR, which can be preset to establish a desired recording program, and in which the amount of tape or other record medium available in the recording and reproducing apparatus is checked against the amount of tape required for completing a preset recording program so as to avoid the inadvertent failure to record all of the desired material by reason of the exhaustion of the supply of tape or other record medium prior to completion of the recording program.

Another object is to provide a recording and reproducing apparatus, as aforesaid, in which a visual signal or indicati on or other alarm is provided in the event that the aggregate of the tape or other record medium needed for the recording of signals thereon in the preset recording intervals constituting the recording program exceeds the amount or capacity of the record medium available for recording in the apparatus.

Still another object is to provide a recording and reproducing apparatus, as aforesaid, in which a signal or alarm is provided in the event that there is overlapping of the preset recording intervals, for example, if the preset recording program seeks to record material being broadcast from one channel at a time when material being broadcast on another channel is also to be recorded.

A further object is to provide a recording and reproducing apparatus, as aforesaid, in which an alarm or signal is provided if, at the time the desired recording program is being preset or established, the apparatus is not in condition for recording, for example, by reason of the absence of a tape cassette or other record medium from the apparatus or the presence in the latter of a tape cassette containing tape which is already recorded with signals to be preserved.

In accordance with an aspect of this invention, an apparatus operative for recording and reproducing signals on a record medium, for example, in the form of a tape contained in a cassette and which has a fine capacity for recorded signals, comprises means for predetermining times at which one or more intervals of recording operation are to be initiated and terminated, respectively, means for providing a first signal representative of the capacity of the record medium which is available for the recording of signals thereon, means for providing a second signal representative of an aggregate capacity of the record medium, that is, the total amount of the latter, needed for the recording of signals thereon in the one or more recording interval initiated and terminated at the predetermined times, comparator means for comparing the first and second signals, and indicator means responsive to the comparator means for indicating when the aggregate capacity needed for recording, as represented by the second signal, is greater than the capacity of the record medium actually available for recording, as represented by the first signal.

In a preferred embodiment of the invention, the means for providing the first signal representative of the capacity of the record medium available for the recording of signals thereon includes at least means detecting a ratio of the recorded to unrecorded regions on the record medium, means for detecting the size of the record medium, that is, the total amount of the record medium, and converting means responsive to the detected ratio of the recorded to unrecorded regions and to the detected size of the record medium for providing said first signal as a function thereof.

In the case where the recording and reproducing apparatus is in the form of a VTR in which the tape is movable at a selected one of a plurality of different speeds, the selected speed is also detected and the previously-mentioned converting means is responsive to the detected speed for also determining the signal representative of the capacity of the record medium available for recording as a function of the detected speed. Further, in the case where the record medium is constituted by a plurality of tape cassettes stored in a cassette changer and being moved in succession to an operative position for the recording of signals therein, the signal representative of the capacity of the record medium available for the recording of signals thereon is also determined as a function of the detected number of tape cassettes in the cassette changer.

The above, and other objects, features and advantages of the invention, will be apparent in the following detailed description of an illustrative embodiment thereof which is to be read in connection with the accompanying drawings.

BRIEF DESCRIPTION OF THE DRAWINGS

FIG. 2 is a schematic block diagram of the circuits according to this invention provided in the VTR of FIG. 1 for presetting a recording program and for automatically checking whether recording operations in accordance with the preset program can be achieved with the tape supply then available in the VTR; and FIG. 3 is a more detailed block digram of the automatic checking circuits according to an embodiment of this invention.

DESCRIPTION OF A PREFERRED EMBODIMENT

Figure 1:
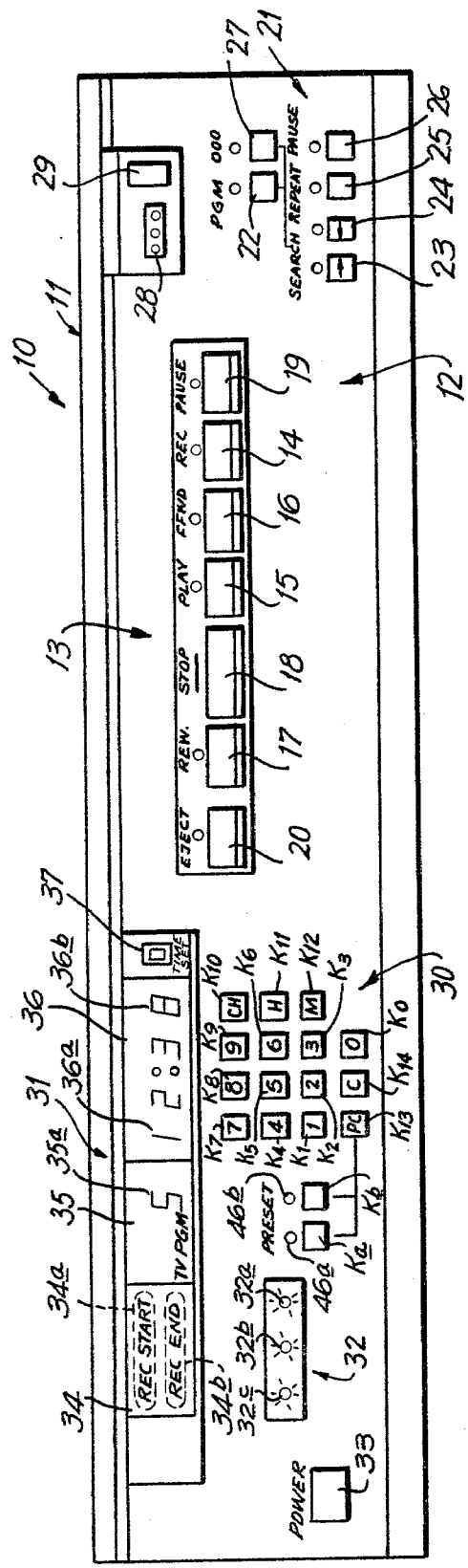
FIG. 1 is a front elevational view of the control panel of a VTR which embodies the present invention.

Referring to FIG. 1 of the drawings in detail, it will be appreciated that the invention is there illustrated as being applied to a recording and reproducing apparatus of the type called a video tape recorder or VTR 10. Only so must of the VTR 10 as is necessary for an understanding of the present invention is disclosed in detail herein, and such VTR 10 may be otherwise of the type available commercially from Sony Corporation as "Betamax" Videocassette Recorder Model SL-8600.

As is shown, VTR 10 conventionally includes a cabinet 11 which, at its front panel 12, is provided with an assembly of arrangement 13 of push-buttons 14–20 by which operating modes of the VTR can be manually selected. More particularly upon the positioning of a cassette in cabinet 11, actuable for initiating recording and a known loading mechanism (not shown) in VTR 10 is made operative to withdraw tape from the operatively positioned cassette and to wrap the withdrawn tape about a guide drum (not shown) thereby establishing the standby condition of the VTR 10. Upon the selective manual actuation of push-button 14 or 15, rotary recording and/or reproducing heads associated with the guide drum are rotated to scan the tape for recording or reproducing, respectively, video signals in obliquely arranged tracks on the tape as the latter is advanced or driven at a selected speed. Push-button 16 is actuable to select a fast-forward mode of operation in which the tape is driven at high speed from the supply reel to the take-up reel within the cassette housing. Push-button 17 of assembly 13 is actuable to select a rewind mode of operation in which the tape is driven at high speed in the direction from the take-up reel back to the supply reel. In either the fast-forward or the rewind mode of operation, rotation of the rotary heads may continue to permit quick searching of the recorded signals. Push-button 18 is effective, when actuated, to establish the stop mode of the VTR in which, for example, a recorded or playback operation of the VTR is terminated by stopping the tape movement and the rotation of the rotary heads while the tape remains wrapped on the guide drum. On the other hand, push-button 19 is effective, when actuated, to establish the pause mode of operation in which a recording or playback operation is temporarily interrupted by stopping movement of the tape while the rotary heads continue to rotate. Finally, push-button 20 is effective, when actuated, to cause unwrapping of the tape from the guide drum and its return to the cassette, whereupon the tape cassette is ejected from its operative position in cabinet 11.

The tape used in VTR 10 may have control pulses recorded at locations spaced apart along the tape so that such control pulses can be counted during movement of the tape for identifying positions along the tape at which various program materials are recorded. The VTR 10 may be provided with a program searching arrangement of the type disclosed in U.S. patent application Ser. No. 891,278, filed Mar. 29, 1978, and having a common assignee herewith, for facilitating the playback of selected portions of the recorded material. Alternatively, as shown, an assembly 21 of searching control switches may be provided at one side of control panel 12 for controlling the operation of VTR 10 when searching for the positions at which various materials are recorded on the tape. More particularly, the switch assembly 21 may include a programmed-searching switch 22 which, when actuated, causes the searching to be effected according to the previously memorized or stored program. In other words, values of the control pulses counted from the beginning of the tape and at which the recordings of the various materials are initiated on the tape are previously stored in a memory. Thereafter, if switch 22 is actuated simultaneously with either a forward-direction switch 23 or a reverse-direction switch 24, the tape is moved rapidly at a searching speed in either the forward direction or the reverse direction, respectively, until reaching a position corresponding to the next programmed or stored value of the counted control pulses, at which position the movement of the tape is automatically arrested and a reproducing or playback operation of the VTR is commenced. The switch assembly 21 has a repeat switch 25 which may be actuated to cause the tape to be automatically returned at high speed to the position corresponding to the beginning of the recording of the program material then being played back at the searching speed. If a pause switch 26 of assembly 21 is actuated during a search operation, the movement of the tape is arrested temporarily and, thereafter, upon the actuation of the switch 23 or 24, the tape is again moved rapidly in either the forward or reverse direction the position of the next stored or programmed value of the counted control pulses. If it is desired to search a recorded tape without reference to values or counts of the control pulses previously stored in a memory, a switch 27 of assembly 21 can be actuated simultaneously with either the forward-direction switch 23 or reverse-direction switch 24 for effecting a desired searching movement of the tape independently of the preset or memorized playback program. During such searching independently of the preset or memorized program, a counter 28 counts the control pulses reproduced from the tape, and such counter 28 can be returned or reset to its zero setting or count by actuation of a reset button 29. In a conventional tape counter searching mode, counter 28 is set to zero by actuation of its reset button 29 at the tape position where the recording of desired program material on the tape is commenced and, at the completion of such recorded material, switches 24 and 27 can be actuated simultaneously to cause high speed tape movement in the reverse direction, with the reverse movement of the tape being automatically halted when counter 28 returns to zero, that is, at the beginning of the recorded program material. Since the searching operation of VTR 10 is not related to the present invention, the same has been only briefly described with the foregoing.

The front or control panel 12 of VTR 10 according to this invention is further shown to have a keyboard 30 comprised of a number of switch operating keys which are actuable, as hereinafter described in detail, for presetting a recording program for VTR 10, a display section 31 at which various aspects of the recording program are displayed during the presetting thereof, an indicator assembly 32 at which visual indications or other alarms are given in the event that the preset recording program for VTR 10 is defective or unattainable for any one of various reasons, as hereinafter described in detail, and a power supply switch 33 which, as is conventional, may be actuated for connecting the VTR to a source of electrical power.

The keyboard 30 is shown to include ten key-operated switches $K_0, K_1, K_2, —K_9$, corresponding to the numbers 0, 1, 2, —9. Keyboard 30 further includes a key-operated switch $K_{10}$ bearing the legend "CH" and which, when actuated, identifies the number represented by the actuated keys $K_0-K_9$ as being that of a television channel. Similarly, keyboard 30 includes key-operated switches $K_{11}$ and $K_{12}$ bearing the legends "H" and "M", respectively, and which, when actuated, respective identify the number represented by the actuated key-operated switches $K_0-K_9$ as representing the hour and minutes, respectively, of a selected time. Finally, Keyboard 30 is shown to include a key-operated switch $K_{13}$ bearing the legend "PC" which may be actuated to clear or cancel a program previously stored in a memory, as hereinafter described in detail, and a key-operated switch $K_{14}$ bearing the legend "C" which may be actuated to clear the keyboard 30. Furthermore, key-operated switches $K_a$ and $K_b$ are mounted next to keyboard 30 and can be selectively actuated for selecting respective addresses in a memory, as hereinafter described in detail.

The display section 31 of control panel 12 is shown to include a portion 34 at which a legend "REC Start" indicated at 34a or a legend "REC End" indicated at 34b can alternatively flash or appear for respectively indicating the start or initiation and the end or termination, respectively, of a recording interval. The display section 31 further includes a portion 35 for displaying, as indicated at 35a, the number of a television channel which has been selected to be the source of program material to be recorded. Finally, a display section 31 is shown to include a portion 36 at which hours and minutes of actual or selected time are displayed, as at 36a and 36b, respectively, and a reset button or switch 37 which can be actuated when it is desired to set the actual time displayed at portion 36 to exactly the correct time.

The indicator assembly 32 is shown to include first, second and third indicators or lamps 32a, 32b and 32c, respectively, which are energized or illuminated, as hereinafter described in detail, for indicating to the user that one or more problems exist in respect to a recording program which is being reset or stored. More particularly, and as will hereinafter appear in detail, indicator lamp 32a is energized to indicate that the amount of tape available for recording of signals thereon is less than the amount of tape that would be required for completing the recording program being preset, while indicator lamp 32b is energized or aluminated to indicate that there is overlapping between two or more of the recording intervals comprising the recording program. Further, indicator lamp 32c is energized or illuminated to indicate that VTR 10 is not in a condition for carrying out the preset recording program, for example, for indicating that no tape cassette is operatively positioned in the VTR or that the operatively positioned tape cassette contains tape having signals already recorded thereon which are to be preserved, or for indicating that the VTR is in its pause mode of operation and, therefore, cannot be made to effect the automatic recording operations in accordance with the preset recording program.

Referring now to FIG. 2, it will be seen that, in the circuits according to this invention for presetting or programming and checking a recording program, switches $K_0, K_1, K_2, —K_{14}$ of keyboard 30 are connected to an encoder 38 which, in response to closing the actuation of one or more of such key-operated switches $K_0-K_{14}$, provides a correspondingly coded signal to a system control circuit or CPU 39. Similarly, the address-selecting switches $K_a$ and $K_b$ and the time resetting switch 37 are connected to an encoder 40 which provides a suitably coded signal to system control circuit 39 in response to the closing of any one of switches $K_a$, $K_b$ and 37.

The programming and checking circuits according to this invention are further shown on FIG. 2 to generally comprise a memory circuit 41 having a plurality of addresses corresponding to the number of the addressing switches $K_a$ and $K_b$, a writing circuit 42 by which all of the required information concerning a recording interval of the recording program can be written at a selected address of memory circuit 41 in response to suitable signals from system control circuit 39, and a reading circuit 43 by which rhe recorded information concerning each recording interval of a recording program can be read out of the respective address of memory circuit 41 under the control of system control circuit 39. It will also be seen that temporary storage circuits or memories 44 and 45 are connected with system control circuit 39 for temporarily storing the coded signals applied to circuit 39 from encoders 38 and 40, as hereinafter described in detail. If desired, indicator lamps 46a and 46b disposed adjacent addressing switches $K_a$ and $K_b$ (FIG. 1) on control panel 12 may be energized by suitable signals from system control circuit 39 when the addressing switches $K_a$ and $K_b$, respectively, are energized. Thus, the illumination of one or the other of indicator lamps 44a and 46b is effective to indicate that the recording program information is being preset in, or read out from the respective address in memory circuit 41.

A display selector circuit 47 under the control of system control circuit 39 is effective to select the various displaying operations of display section 31 which are obtained through a display driving circuit 48. A clock circuit 49 normally responds to pulses from a pulse generator 50 to provide a signal corresponding to the actual or present time which is applied to display selector circuit 47 for causing the display of such actual or present time at the portion 36 of display section 31 However, upon the actuation of preset switch 37, system control circuit 39 provides suitable signals by which pulse generator 50 no longer controls clock circuit 49, at least momentarily, while a gate circuit 51 is opened and a preset circuit 52 is made operative to apply correcting pulses through gate circuit 51 to clock circuit 49 for correcting the time represented by the output signal from clock circuit 49. Upon the release of switch 37, clock circuit 49 returns to its normal control by pulse generator 50. Further, upon operation of preset circuit 52, a signal is provided for the latter through display selector 47 so that changing actual time represented by the signal from clock circuit 49 is displayed at portion 36 of display section 31.

A time display blanking circuit 53 is operable by a suitable signal from system control circuit 39 whenever the key-operated switch $K_{11}$ or the key-operated switch $K_{12}$ of keyboard 30 is actuated for presetting the hours or minutes, respectively, of a time for initiating or terminating a recording interval of the recording program. In response to operation of blanking circuit 53, an output from the latter is provided to display selector circuit 47 with the result that the signal from clock circuit 49 representing the present or actual time no longer determines the display at portion 36 of display section 31, that is, the actual or present time display is blanked. A flashing circuit 54 is made operable by a suitable signal from system control circuit 39 during presetting of a recording program. The resulting intermittent output of flashing circuit 54 is applied to an AND circuit 55 along with the output of time display blanking circuit 53 to provide an output to display selector circuit 47 by which a time indication then displayed at portion 36 of display section 31 during presetting of the recording program, as hereinafter described, is made to flash on and off so as to distinguish the same from the present or actual time indication otherwise displayed at portion 36 of display section 31.

It is to be noted that a portion of the output of reading circuit 43 which identifies the television channel from which broadcast material is to be recorded during each recording interval of a preset recording program is supplied, for example, through a digital-to-analog converter (not shown) to an electronic tuner of an associated television receiver (not shown) for tuning the latter to the selected channel.

A time comparator and VTR control 56 is connected with clock circuit 49 and memory circuit 41 so that, when the actual or present time indicated by the output of clock circuit 49 corresponds to a time stored in memory 41 for the initiation or termination of a recording interval of the preset recording program, circuit 56 provides a suitable control signal to the associated VTR for either initiating or terminating, respectively, a recording operation of the latter.

In accordance with the present invention, a checking and alarm circuit 57 is shown on FIG. 2 to be connected with system control circuit 39 so as to be operative, upon the presetting of a recording program, for controlling the operation or illumination of the several indicators 32a, 32b and 32c on the basis of a comparison of signals stored in memory circuit 41 with various factors or conditions which determine whether or not the corresponding preset recording program is feasible.

As shown in greater detail on FIG. 3, the checking and alarm circuit 57 provided in accordance with this invention includes a time interval summing circuit 58 which receives, from memory circuit 41 by way of reading circuit 43, the stored signals representing the times $t_s$ and $t_e$ at which the respective recording intervals are to start or be initiated and to end or terminate, respectively. The circuit 58 generally consists of a subtractor by which the starting time $t_s$ of each recording interval preset in memory 41 is subtracted from the respective ending time $t_e$, a compensator which converts from the 12-hour system to the 24-hour system in the event that the times for starting and ending each recording interval are memorized or stored in accordance with the 12-hour A.M. and P.M. system, and an adder for adding together or summing the compensated times required for the several preset recording intervals and thereby providing the time $T_P$ which is the aggregate or total playing time of the VTR required for the preset recording program. The signal representing the total time $T_P$ required for the preset recording program is supplied to a comparator 59 for comparison in the latter with a signal $T_R$ representing the amount or capacity of record medium available for recording. Such signal $T_R$ is provided by a converting circuit 60 as a function of various detected conditions that determine the capacity of the tape or other record medium available for the recording of signals. More particularly, as shown, a detecting circuit 61 and a memory 62 receiving the output signal therefrom provide an output R which represents a ratio of the unrecorded to recorded regions of a record medium then operatively positioned within the associated VTR 10. For example, in the case where the record medium is constituted by a tape cassette having supply and take-up reels on which the tape is wound, the rotational speed of the reels will vary oppositely as the tape is unwound from one reel and rewound on the other in the course of the recording of signals on the tape. In such case, the detector 61 may be constituted by a frequency comparator which receives pulses, as indicated at 61a and 61b from pulse generators (not shown) associated with shafts coupled to the supply and take-up reels. It will be apparent that, as recording of signals on the tape progresses so that the diameter of the wound tape on the take-up reel increases and the diameter of the wound tape on the supply reel decreases, the frequency of the pulses supplied at 61a will decrease and the frequency of the pulses supplied 61b will increase. Such relative change in the frequencies of the pulses applied at 61a and 61b will be detected by comparator 61 as a measure of the relative amounts of the tape on the take-up and supply reels, respectively. Since the ratio of amounts of tape on the supply and take-up reels corresponds to the output signal of comparator 61, that is, the ratio of the amounts of tape that are recorded and unrecorded, respectively, such output signal is applied to memory 62 and is retained in the latter so long as it remains uncharged by reason of the fact that the VTR is not performing a recording operation.

In some instances, a VTR may be arranged to alternatively receive various different size cassettes. Accordingly, a detector 63 is provided to detect or measure the size of a cassette operatively positioned in the associated VTR and to supply a corresponding signal $T_C$ to the converting circuit 60.

Moreover, even when cassettes of only one size are receivable in the operative position or holder of a VTR, the latter may be constructed and arranged to operate at two different tape speeds so that, if a cassette is dimensioned to provide one hour of recording time when the tape is driven at a particular or first speed, the same cassette will provide two hours of recording time when driven at a second speed which is one half the first speed. Accordingly, a detector 64 is provided to detect the selected tape speed of the associated VTR and to provide a corresponding signal 1 H/2 H to the converting circuit 60. Finally, for accommodating the case where the associated VTR is provided with a cassette changer adapted to hold a plurality of cassettes which are moved in succession, as needed, to the operative position in the VTR, an additional detector 65 is provided to detect the number of cassettes remaining in the cassette changer and to provide a corresponding signal N to converting circuit 60. Thus, it will be appreciated that converting circuit 60 provides the signal $T_R$ representing the total capacity of the tape or other record medium available for recording as a function of the previously-mentioned signals R, $T_C$, 1 H/2 H and N.

Comparator 59 compares signals $T_R$ and $T_P$ and, in the event that such signals indicate that the capacity of the record medium needed for completing the preset recording program is larger than the available capacity of the record medium, then the output of comparator 59 causes an indicator driving circuit 66 to effect energization of the indicator lamp or alarm 32a.

The signals $t_s$ and $t_e$ read out of memory 41 and representing the times at which the preset recording intervals are to be initiated and terminated which are also applied to a circuit 67 which detects whether the preset recording intervals, for example, as defined by time signals stored or retained at the two addresses, respectively, of memory 41, have any overlap. In the event of such overlap of the preset recording intervals, detector 67 provides an output signal to driving circuit 66 so that the latter energizes or illuminates indicator lamp or alarm 32b for calling such overlap to the attention of the user. It is apparent that overlapping of the two or more recording intervals cannot be countenanced as the corresponding recording program could require the simultaneous recording on a single tape of signals being broadcast from two different stations or channels, which mode of recording is not possible.

It is further common practice to provide the housing of a tape cassette with a tab which is removable therefrom to indicate that the tape contained within the cassette housing has signals recorded thereon which are to be retained or preserved. Therefore, the checking and alarm circuit according to this invention also preferably includes a detector 68 which is capable of detecting the presence or absence of such tab on a cassette operatively positioned in the VTR. In the event of the mentioned tab being absent from the cassette housing, tab detector 68 provides an output signal which causes driving circuit 66 to energize or illuminate indicator lamp or alarm 32c and thereby call attention of the user to the fact that the operatively positioned cassette should not be use for further recording operations. The indicator 32c may be alternatively energized or illuminated by driving circuit 66 in response to the receipt by the latter of a signal from a detector 69 which, for example, detects that no cassette has been operatively positioned in the VTR, that loading of the tape from the cassette onto the guide drum has not yet been completed, or that the VTR is in its pause mode of operation, for example, by reason of the actuation of pushbutton 19. It will be appreciated that, in such pause mode of operation, the VTR cannot respond to the preset information in memory 41 which would otherwise cause the VTR to engage in successive recording operations.

The previously-described apparatus according to this invention operates as follows:

When a recording program is to be preset, one or the other of the address-selecting switches, for example, the switch $K_a$, is manually closed so that encoder 40 provides a corresponding function signal to system control circuit 39 which function signal is stored temporarily in the temporary storage circuit or memory 45. In response to such function signal, system control circuit 39 causes operation of time display blanking circuit 53 and flashing circuit 54 so that display selector circuit 47 causes blanking of the time display portion 36 and the flashing display at portion 34 of the legend "REC START", as indicated at 34a. In response to the closing of switch $K_a$, a circuit 39 also causes illumination of address lamp 46a for indicating that any information subsequently selected in respect to a recording interval will be stored in the corresponding address of memory 41.

Then, key-operated switches $K_0$–$K_9$ of key-board 30 are selectively actuated so as to indicate the number of a television channel to which the VTR is to be tuned during a first recording interval. The encoder 38 provides a signal corresponding to the selected channel number, for example, channel "5", and such signal is transmitted through system control circuit 39 for temporary storage in memory or temporary storage circuit 44. Thereafter, when key-operated switch $K_{10}$ of keyboard 30 is actuated, the resulting signal from encoder 38 causes system control circuit 39 to transfer the stored signals from temporary storage circuits or memories 44 and 45 through writing circuit 42 to the previously selected address in memory 41. Simultaneously with such writing operation, system control circuit 39 causes reading circuit 43 to read the channel number being then inserted or written in memory 41, and further causes the display selector 47 to pass the signal corresponding to the channel number for causing driving circuit 48 to effect the display of the selected channel number "5" at portion 35 of display section 31.

During the operation of reading circuit 43, as described above, the signal read out of memory circuit 41 and corresponding to the selected channel number is, as previously mentioned, supplied to an electronic tuner for effecting channel selection. Thus, even if the described arrangement is not employed for presetting a recording program, for example, if the VTR is to be attended to during its recording operation, the key-operated switches $K_0$–$K_9$ and $K_{10}$ of keyboard 30 can be selectively actuated for effecting channel selection.

After the channel number has been selected for the first recording interval, the key-operated switches $K_0$–$K_9$ are again selectively actuated to indicate the hour of the time at which the first recording interval is to be initiated and the corresponding signal from encoder 38 is passed through circuit 39 for temporary storage in memory or temporary storage circuit 44. Then, upon actuation of key-operated switch $K_{11}$, the resulting signal is drawn from temporary storage circuit 44 and, if found by circuit 39 to be proper for indicating an hour, is passed to writing circuit 42 so as to be written at the selected address of memory 41. Once again, the signal representing the hour at which the first recording interval is to be initiated is read by reading circuit 43 and, by way of display selector 47 and display driving circuit 48, causes the flashing display of such hour indication at 36a in portion 36 of display section 31. Thereafter, key-operated switches $K_0$14 $K_9$ are selectively actuated to indicate the minutes of the time at which the first recording interval is to be initiated and, upon actuation of switch $K_{12}$, the resulting signal is transfered from temporary storage circuit 44 through system control circuit 39 so as to be written at the previously actuated address in memory 41 by writing circuit 42, while reading circuit 43 and circuits 47 and 48 cause the flashing display of the selected minutes indicated at 36b in portion 36 of display section 31.

After the channel number for the first recording interval and the hours and minutes of the time for initiating the first recording interval have been stored in memory 41, the sequencing function of system control circuit 39 causes display selector circuit 47 and driving circuit 48 to extinguish the legend "REC START" and, at some short predetermined time thereafter, for example, one second thereafter, to commence the flashing energization or illumination of the legend "REC END", as indicated at 34b. Further, at such time, the portion 36 of display section 31 is again made blank. Thereafter, key-operated switches $K_0$–$K_9$ are selectively operated along with switch $K_{11}$, and then with switch $K_{12}$ for recording in the first actuated address of memory 41 signals corresponding to the hours and minutes of the time at which the first recording interval is to be terminated. As before, the signals corresponding to the time at which the first recording interval is to terminate are read by reading circuit 43 so that display selector and driving circuits 47 and 48 are then effective to display, at portion 36 of display section 31, the hours and minutes of the selected time for termination of the first recording interval.

After all of the required control information for the first recording interval, that is, the channel number and the times for initiation and termination, respectively, of the first recording interval, have been stored in one of the addresses of memory 41 activated by the closing of switch $K_a$, the other address selecting switch $K_b$ can be closed and the above described operations are repeated so as to similarly record or store at a second address of memory 41 the pertinent information, namely, channel number and times of initiating and terminating the recording interval, in respect to a second recording interval.

Although the apparatus according to this invention has been described as having a memory 41 with two addresses selectively activated by switches $K_a$ and $K_b$, and thus adapted for receiving information as to two successive recording intervals, it will be appreciated that an apparatus according to this invention may be provided with a memory having three or more addresses at which information can be stored in respect to three or more successive recording intervals of a preset recording program.

At any time during the presetting of the recording program in memory 41 or upon the completion of the presetting of the recording program, the checking and alarm circuit 57 and the various indicator lamps 32a, 32b and 32c cooperate to indicate to the user if, for any reason, the recording program which is being preset or has been preset is not achievable or should not be attempted. Thus, as previously described with reference to FIG. 3, if comparator 59 indicates that the available capacity of the tape or other record medium for recording of signals thereon, as indicated by the signal $T_R$ is smaller than the total amount of tape or record medium required for the preset recording program, as indicated by the signal $T_P$, then indicator lamp 32a is illuminated to direct the user's attention to that fact. In that case, the user may, for example, change the recording program by reducing the overall or total length of time thereof, or a partially recorded cassette may be replaced with a wholly blank cassette capable of accommodating the entire preset recording program. Further, if there is overlapping between the times selected for the first and second recording intervals, such overlapping is detected by detecting circuit 67 and causes illumination of indicator lamp 32b so that the user is then advised to change the times of one or both of the recording intervals for avoiding the undesired overlapping. If the tape cassette installed in the VTR is already recorded with signals which are to be preserved, that face is percieved by tab detector 68 to cause illumination of indicator lamp 32c, whereupon the user may replace such tape cassette with one either having blank or unrecorded tape or recorded with signals which may be erased. Moreover, indicator lamp 32c will be energized in any case where performance of the preset recording program is not possible because recording operation cannot be effected, for example, because there is no cassette in the VTR, the loading operation of the tape from the cassette onto the guide drum has not been completed, or the VTR is in the pause mode of operation, all of the conditions can be readily corrected by the user prior to leaving the VTR unattended for performance of the desired recording program.

It will be appreciated that, after the recording program has been preset in memory 41, as previously described and assuming that checking and alarm circuit 57 has not indicated any problem in performing such preset recording program, then memory circuit 41, clock circuit 49 and time comparator and VTR control 56 will cooperate in causing recording operation of the VTR in accordance with the preset recording program. More particularly, upon coincidence of the actual or present time indicated by clock circuit 49 with a time stored in memory 41 for the initiation or termination of a recording interval, circuit 56 will provide a corresponding control signal to VTR 10 for either initiating or terminating the recording operation of the latter. Furthermore, through reading circuit 43, each preset channel number will be read out of memory circuit 41 so as to ensure that each recording operation of the VTR established by circuit 56 will occur with the tuner conditioned to receive the broadcast signal of the desired channel.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus operative for recording and reproducing signals at a plurality of selectable variable length times on a record medium which has a finite capacity for recorded signals comprising: means for pedetermining times at which each variable length time of recording is to be initiated and terminated, respectively, means for providing a first signal representative of the capacity of the record medium which is available for the recording of signals thereon, means for providing a second signal representative of an aggregate capacity of the record medium needed for the recording of signals thereon in the total of said variable length times initiated and terminated at said predetermined times, comparator means for comparing said first and second signals, and indicator means responsive to said comparator means for indicating when said aggregate capacity needed for recording as represented by said second signal is greater than said capacity available for recording as represented by said first signal.

2. An apparatus according to claim 1; in which said means for providing the first signal includes means for detecting a ratio of recorded to unrecorded regions on said record medium, means for detecting the size of said record medium, and converting means responsive to the detected ratio of the recorded to unrecorded regions and to the detected size of the record medium for determining said first signal as a function thereof.

3. An apparatus according to claim 2; in which, during recording and reproducing, said record medium is movable at a selected one of a plurality of different speeds, and in which said means for providing the first signal further includes means for detecting the selected speed, and said converting means is also responsive to the detected speed for determining said first signal as a function thereof.

4. An apparatus according to claim 2; in which said record medium is constituted by a plurality of tape cassettes stored in a cassette changer and being moved in succession to an operative position for the recording of signals therein; and in which said means for providing the first signal further includes means for detecting the number of tape cassettes in the cassette changer remaining to be moved to said operative position, and said converting means is also responsive to the detected number of tape cassettes remaining to be moved to the operative position for determining said first signal as a function thereof.

5. An apparatus according to claim 1; in which said means for predetermining times, includes memory means, means for writing said times in said memory means, timer means for indicating actual time, and means responsive to coincidence of said times written in the memory means with said actual time to cause the initiation and termination of a recording operation by the apparatus.

6. An apparatus according to claim 5; in which said memory means has a plurality of addresses at which times corresponding to the initiation and termination of respective recording intervals are written in succession; and further comprising detecting means for detecting any overlap of the recording intervals having their respective times of initiation and termination written at said addresses of the memory means, and indicator means responsive to said detecting means for indicating when said overlap exists.

7. An apparatus according to claim 6; in which the signals to be recorded are television signals from a television receiver having a tuner which is controllable to receive signals broadcast in a selected one of a plurality of channels; and further comprising means for writing at each of said addresses of the memory means the broadcast channel from which television signals are to be recorded on said record medium during the respective recording interval, and means for controlling the tuner in dependence on the broadcast channel written at each of said addresses during the respective recording interval.

8. An apparatus according to claim 1; in which said recording medium is constituted by a cassette with a tape therein for the recording and reproducing of signals thereon when the cassette is disposed in an operative position, and said cassette has a removable tab which, by its absence indicates that a recording operation is not to be performed on the respective tape; and further comprising detecting means for detecting the absence of a tab from a cassette at said operative position, and second indicator means responsive to said detecting means so as to be energized when the latter detects the absence of a tab from a cassette at said operative position.

9. An apparatus according to claim 8; in which the apparatus has a pause mode for interrupting a recording or reproducing operation; and further comprising means for energizing said second indicator means when the apparatus is in said pause mode thereof.

10. An apparatus according to claim 8; further comprising means for energizing said second indicator means upon the absence of a cassette from said operative position.

11. An apparatus according to claim 8; in which the tape is withdrawn from the cassette in the course of a loading operation for the recording and reproducing of signals on the tape at the exterior of the cassette; and further comprising means for energizing said second indicator means when said loading operation is taking place.

12. An apparatus operative for recording and reproducing signals at a plurality of selectable variable length times on a record medium which has a finite capacity for recorded signals and which is movable at a selected one of a plurality of different speeds, comprising: means for predetermining times at which each variable length time of recording is to be initiated and terminated, memory means, means for writing said times in said memory means, timer means for indicating actual time, means responsive to coincidence of said times written in the memory means with said actual time to cause the initiation and termination of a recording operation by the apparatus, means for detecting any overlap of the times of initiation and termination written in said memory means, indicator means responsive to said detecting means for indicating when said overlap exists, means for writing a television channel in said memory means corresponding to each of said times written in said memory means, means for controlling a television tuner in dependence on the television channel written in said memory means, means for providing a first signal representative of the capacity of the record medium which is available for the recording of signals thereon, said means for providing a first signal including means for detecting a ratio of recorded to unrecorded regions on said record medium, means for detecting the size of said record medium, means for detecting the selected speed, converting means responsive to the detected ratio of the recorded to unrecorded regions, the detected size of the record medium and the detected speed to produce said first signal as a function thereof, means for providing a second signal representative of an aggregate capacity of the record medium needed for the recording of signals thereon in the total of said variable length times initiated and terminated at said predetermined times, comparator means for comparing said first and second signals, indicator means responsive to said comparator means for indicating when said aggregate capacity needed for recording as represented by said second signal is greater than said capacity available for recording as represented by said first signal, and means for indicating when recording is not possible.

13. An apparatus operative for recording and reproducing signals at a plurality of selectable variable length times on a recording medium which has a finite capacity for recorded signals comprising: means for predetermining times at which each variable length time of recording is to be initiated and terminated, respectively, first means for indicating the capacity of the record medium which is available for the recording of signals thereon, second means for indicating an aggregate capacity of the record medium needed for the recording of signals thereon in the total of said variable length times initiated and terminated at said predetermined times, comparator means for comparing indications from said first and second means, and third means responsive to said comparator means for indicating when said aggregate capacity needed for recording is greater than said capacity available for recording.

14. An indicating apparatus for use with a recording apparatus of the type operative for recording signals at a plurality of selectable variable length times on a recording medium, said recording medium having a finite capacity for recorded signals, comprising:

first means for determining said finite capacity;

second means for determining an aggregate capacity of said record medium needed for recording signals at the total of said plurality of selectable variable length times; and third means, responsive to a comparison of determinations of said first and second means, for indicating when said aggregate capacity exceeds said finite capacity.

* * * * *